(12) United States Patent
Click, Jr. et al.

(10) Patent No.: US 8,046,544 B2
(45) Date of Patent: *Oct. 25, 2011

(54) GARBAGE COLLECTION BARRIER WITH DIRECT USER MODE TRAPS

(75) Inventors: Cliff N. Click, Jr., San Jose, CA (US); Gil Tene, Los Altos Hills, CA (US); Michael A. Wolf, San Francisco, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,579

(22) Filed: Nov. 25, 2009

(65) Prior Publication Data

US 2010/0180090 A1    Jul. 15, 2010

Related U.S. Application Data

(63) Continuation of application No. 12/082,239, filed on Apr. 8, 2008, now Pat. No. 7,647,458, which is a continuation-in-part of application No. 11/321,694, filed on Dec. 28, 2005, now abandoned.

(60) Provisional application No. 60/640,383, filed on Dec. 30, 2004.

(51) Int. Cl.
   *G06F 13/00*    (2006.01)

(52) U.S. Cl. .......... 711/159; 711/200; 711/206
(58) Field of Classification Search .......... 711/159; 707/200, 206
   See application file for complete search history.

(56) References Cited

U.S. PATENT DOCUMENTS

| | | | | |
|---|---|---|---|---|
| 5,845,298 | A * | 12/1998 | O'Connor et al. | 1/1 |
| 6,226,653 | B1 * | 5/2001 | Alpern et al. | 1/1 |
| 6,470,361 | B1 * | 10/2002 | Alpern et al. | 1/1 |
| 6,510,440 | B1 * | 1/2003 | Alpern et al. | 1/1 |

* cited by examiner

*Primary Examiner* — Reba I. Elmore
(74) *Attorney, Agent, or Firm* — Van Pelt, Yi & James LLP (57) ABSTRACT

A computer system includes a processor; and a memory coupled to the processor, configured to provide the processor with a plurality of instructions including a set of garbage collection instructions configured to perform one or more garbage collection barrier operations and a subsequent instruction that immediately follows the garbage collection instruction; wherein the processor is configured to execute the set of garbage collection instructions, including by: evaluating a memory reference to determine a condition associated with the set of garbage collection instructions; and in the event that the condition is met, while maintaining the same privilege level, saving information that is based at least in part on the current value of a program counter, and setting the program counter to correspond to a target location that is other than the location of the subsequent instruction.

26 Claims, 6 Drawing Sheets

| A | $X_{TH0}$ |
| --- | --- |
| AB | $X_{TH3}$ |
| AC | $X_{TH2}$ |
| ABC | $X_{TH2}$ |
| B | $X_{TH3}$ |
| BC | $X_{TH4}$ |
| C | $X_{TH1}$ |

FIG. 6

GARBAGE COLLECTION BARRIER WITH DIRECT USER MODE TRAPS

CROSS REFERENCE TO OTHER APPLICATIONS

This application is a continuation of U.S. patent application Ser. No. 12/082,239, entitled GARBAGE COLLECTION filed Apr. 8, 2008, now U.S Pat. No. 7,647,458 which is a continuation in part of U.S. patent application Ser. No. 11/321,694, entitled GARBAGE COLLECTION filed Dec. 28, 2005 now abandoned, which claims priority to U.S. Provisional Application No. 60/640,383, entitled PAUSELESS GC IN THE AZUL JVM filed Dec. 30, 2004, which are incorporated herein by reference for all purposes.

BACKGROUND OF THE INVENTION

In existing computer architectures that support exception handling, performing exception handling is usually an expensive proposition. Typically, the processor operates in user mode and checks values or pointers for soundness. For example, the processor may check to verify whether a user mode process has permission to access an address that requires kernel privilege level. If the check fails, an exception is thrown and the processor handles the exception by switching from user mode to kernel mode and performing operations such as checking for privilege level in the kernel mode. Often, the processor also switches from kernel mode back to user mode to carry out additional exception handling tasks, such as sending signals to the main process/user indicating that the check has failed. Mode switching requires many processing cycles and is therefore expensive.

In computer environments that support garbage collection, the cost of exception handling is more pronounced since conditions related to garbage collection often require frequent checks, and a large number of exceptions may result. The overhead associated with exception handling can significantly impact the performance of the system. It would be desirable to have a better way to handle exceptional conditions. It would be useful to if exceptional conditions related to garbage collection could be handled without significantly impacting system performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Executing a program in a garbage collected environment is disclosed. A set of program instructions is provided to a processor. The set of program instructions includes one or more garbage collection barrier instructions. A garbage collection barrier instruction performs a sequence of one or more operations that cooperates with the garbage collector without changing the program logic. To execute a garbage collection barrier instruction, a memory reference is evaluated to determine a condition associated with the garbage collection barrier instruction. In some embodiments, the evaluation includes one or more tests. In the event the condition is met, a direct user mode trap (also referred to as fast user mode trap) is executed. The direct user mode trap causes handler code to be executed while the privilege level of the processor is maintained at the same level. In some embodiments, the handler code is self-healing. In other words, the handler repairs the condition that caused the trap, so that the next garbage collection barrier instruction performing the same test(s) will not trigger the trap again.

Figure 1:
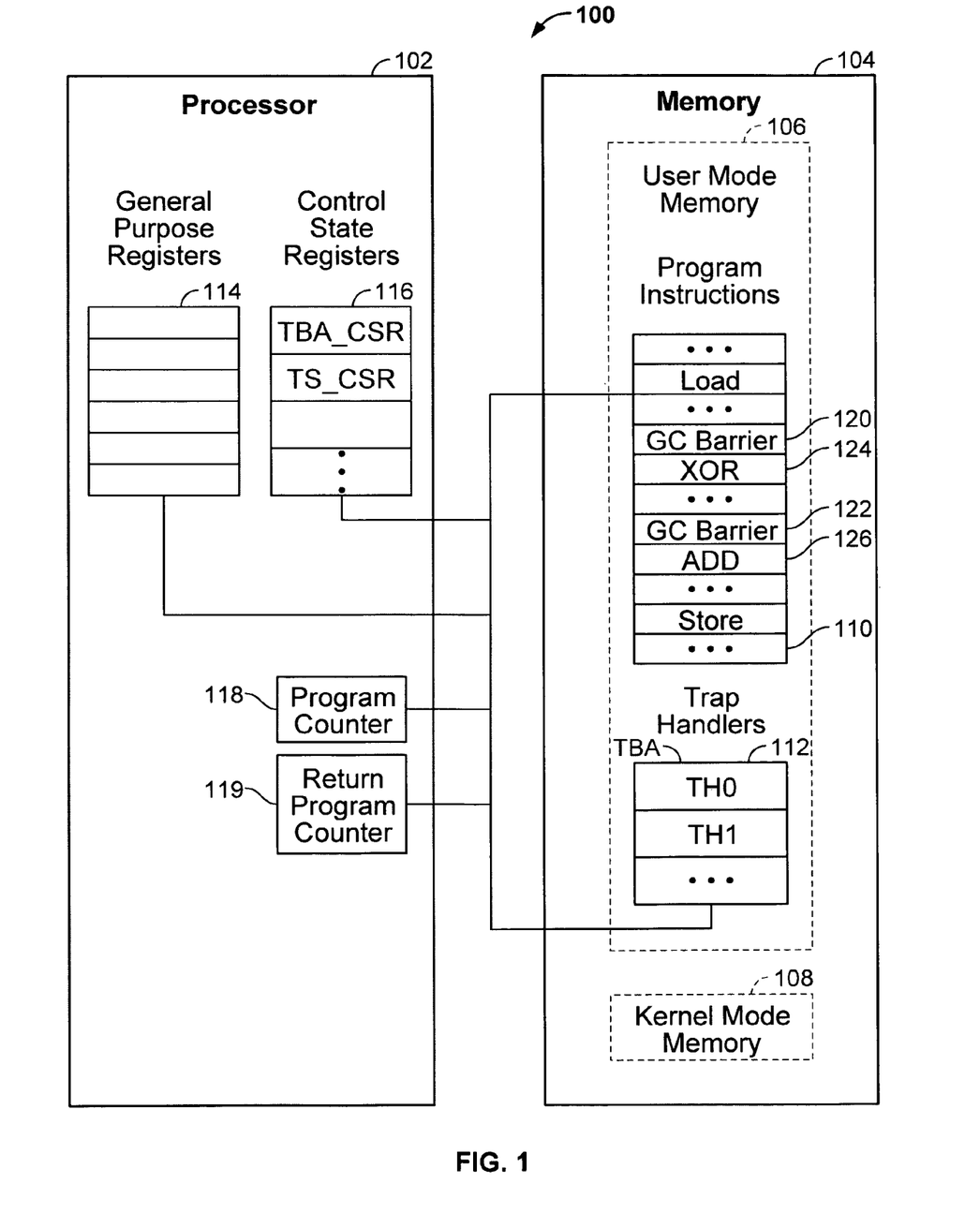
FIG. 1 is a block diagram illustrating an embodiment of a computer system for handling garbage collection barrier instruction using direct user mode traps.

FIG. 1 is a block diagram illustrating an embodiment of a computer system that executes instructions. In this example, system 100 includes a processor 102 for processing instructions and a memory 104 for storing instructions and providing them to the processor. The memory and the processor may be implemented as separate components or combined in an integrated device.

During the operation of the system, memory 104 is divided into a user mode memory region 106 and a kernel mode memory region 108. The division is typically carried out by the operating system, and the amount of memory assigned to each region may vary for different types of operating systems. A user level program operates within the user mode memory region, and typically cannot access the kernel mode memory region without changing access privilege.

In this example, a set of program instructions 110 are loaded from a storage location into the user mode memory region. Some user level program instructions are sometimes referred to as mutators since they can change the state of the heap memory. A garbage collector locates unused objects on the heap and reclaims the memory. Garbage collection barrier instructions are inserted by the compiler or the interpreter before or after specific instructions such as store and load. A garbage collection barrier instruction performs a sequence of one or more operations that cooperates with the garbage collector without changing the mutator's program logic. Also loaded into the user mode memory region are a set of direct user mode trap handlers 112 for handling conditions detected by the garbage collection barrier instructions. The barriers maintain certain mutator invariants, i.e., conditions that are maintained by the mutator to ensure proper operation. For example, a mutator can maintain a mutator invariant to ensure that the mutator does not load references to objects marked as objects to be relocated by the garbage collector during a specific phase of the garbage collection process. The barrier is triggered if the mutator invariants are violated. When a barrier triggers, a direct user mode trap is invoked, thus causing handler code to be executed. As will be described in greater detail below, when the handler code is invoked, the processor stays within the user mode and maintains the same privilege level. Since there is no context switching to the kernel mode, the overhead associated with trap handling is greatly reduced. In this example, the trap handlers are kept in a fixed size array 112. In various embodiments, a barrier instruction is implemented to include one or more tests that check certain mutator invariants, and/or a trap in the event that the mutator invariants are violated. In some embodiments, the hardware (such as the processor) is designed to support special barrier instructions that carry out the barrier tests and/or traps.

Processor 102 fetches the instructions and operates on the instructions by using general purpose registers (GPRs) 114. The processor further includes certain special purpose registers such as program counter (PC) 118 and return program counter (RPC) 119 for tracking the sequence of instruction execution, as well as control state registers (CSR) 116 for providing state/status information, including information for trap handling. For example, the base address of the trap handler array (also referred to as the trap base address (TBA)) is stored in a CSR labeled as TBA_CSR. The size of each trap handler is stored in another CSR labeled as TS_CSR. Storing information in the special purpose registers allows the processor to retrieve information it needs to handle the barrier conditions without switching context.

Figure 2:
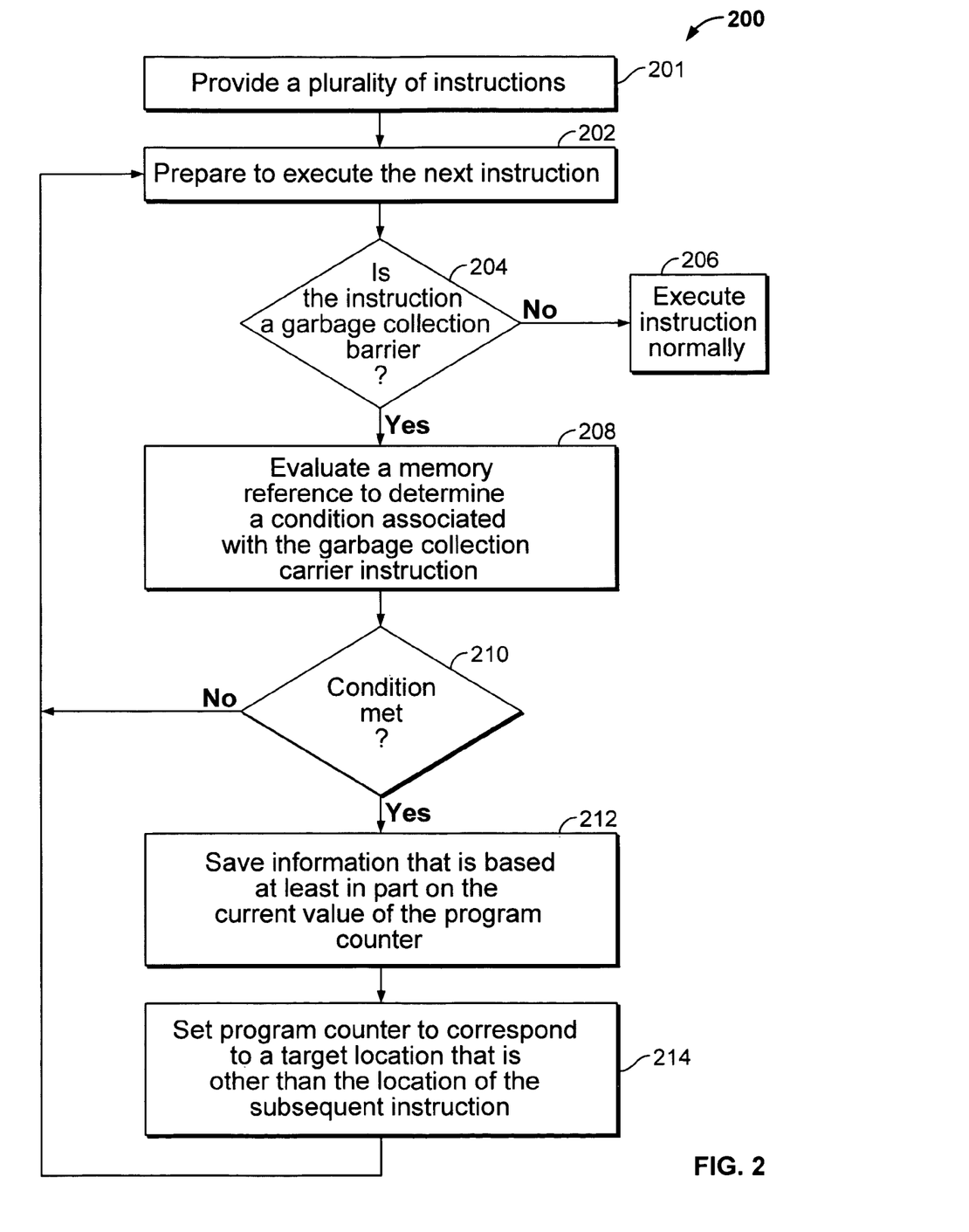
FIG. 2 is a flowchart illustrating an embodiment of a process for executing instructions and handling garbage collection barrier instruction conditions.

FIG. 2 is a flowchart illustrating an embodiment of a process for executing instructions and handling garbage collection barrier conditions. Process 200 may be implemented on a system such as 100. At 201, a plurality of instructions is provided. For example, a mutator comprising a set of instructions such as 110 of FIG. 1 may be provided. The set of instructions includes one or more garbage collection barrier instructions, such as 120 and 122 shown in FIG. 1. The instruction immediately following a garbage collection barrier instruction in the set is referred to as a subsequent instruction. Returning to FIG. 1 for some examples: a subsequent XOR instruction 124 follows garbage collection barrier instruction 120; and a subsequent ADD instruction 126 follows garbage collection barrier instruction 122. As will be discussed in greater detail below, although the subsequent instruction immediately follows the garbage collection barrier instruction in the set of instruction, the subsequent instruction is not always executed right after the garbage collection barrier instruction and may be delayed if the barrier condition triggers.

At 202, the system prepares to execute the next instruction. Returning to FIG. 1 for an example, the program counter determines which one of the plurality of instructions 110 is to be executed next. The next instruction is moved into an appropriate GPR. At 204, the processor determines whether the instruction is a garbage collection barrier instruction. In some embodiments, an opcode field included in the instruction is tested to determine what type of instruction it is. If the instruction is not a garbage collection barrier instruction, the processor executes the instruction normally at 206. If, however, the instruction is a garbage collection barrier instruction, the execution of the garbage collection barrier instruction includes 208-214. At 208, a memory reference is evaluated to determine a condition associated with the garbage collection barrier instruction. The memory reference is one of the arguments of the garbage collection barrier instruction. As will be discussed in greater detail below, the evaluation includes performing one or more tests. Examples of these tests include whether certain value matches an expected value, and whether an object or memory address can be accessed. The association of specific test(s) with a particular garbage collection barrier instruction may be configurable or predetermined. For example, the association may be preconfigured by the opcode of the instruction, one or more configuration bits in the instruction, configuration data associated with the instruction, configuration data in a processor control register, or a combination thereof. Examples of the configuration data include one or more of the following: an indication of a user level processing, one or more configuration bits of an instruction, a system configuration data, a processor configuration data, a program configuration data, and a dynamically updated data.

If the test result(s) indicate that the condition is not met, no handler is invoked and the process returns to 202, where the processor prepares to execute the next instruction by advancing the program counter and fetching the subsequent instruction. If, however, the condition is met, handler code is invoked to deal with the condition. At 212, information based at least in part on the current value of the program counter is saved. In some embodiments, the information is used by the processor to return to executing the subsequent instruction after completing the execution of the handler. In some embodiments, the information saved may be the current value of the program counter, or the current value plus an offset. At 214, the program counter is set to correspond to a target location that is different from the location of the subsequent instruction immediately following the garbage collection barrier instruction. As will be described more fully below, the target location may be derived from the evaluation of the memory reference and processor state information, and is otherwise independent of arguments to the garbage collection barrier instruction. The processor returns to 202 to execute the next instruction. At this point the program counter indicates that the next instruction to be executed is the instruction at the target location. The processor will continue to execute instructions starting at the target location until the handler completes or otherwise chooses to return to the original subsequent instruction. The processor is redirected and information saved at 212 is used to help the processor return to where it left off so that the subsequent instruction immediately following the processor is executed.

Returning to FIG. 1 for an example. Garbage collection barrier instruction 120 is executed, and a memory reference is evaluated to determine whether a condition is met. If the condition is met, the current program counter value (or current program counter value plus an offset) is saved according to 212 of process 200. According to 214 of process 200, the program counter is set to a target location that corresponds to a trap handler such as TH0 or TH1 in trap handler array 112. The target location is different from the location of the subsequent instruction immediately following the garbage collection barrier instruction. In this example, the subsequent instruction immediately following the garbage collection barrier instruction is XOR instruction 124. The processor will execute the handler, and use the saved information to return to execute the load instruction.

Different types of garbage collection barrier tests may be implemented in various embodiments. Examples of garbage collection barrier tests include the Not Marked Through Barrier (NMTB), the Load Value Protection Barrier (LVPB) that are barriers for load operations, and the Matrix Barrier.

In some embodiments, separate instructions are used to implement the different tests. In some embodiments, a single instruction may implements multiple barrier tests. In some embodiments, a load barrier may be implemented by using an LVB barrier instruction that implements both the NMTB and the LVPB barrier tests. For example, in a set of program instructions, wherever a load instruction exists to load the content of memory at a specific address Addr into a memory reference argument Ref, an LVB barrier instruction is inserted between the load instruction and subsequent uses of the Ref argument by the program. Addr and Ref are passed as arguments to the LVB barrier instruction. In some embodiments, if the NMTB test triggers, a NMT handler is invoked; if the LVB test triggers, the LVB handler is invoked. In some embodiments, there is a single handler to handle the triggering of either test.

In some embodiments, the garbage collector is configured to mark, remap, and relocate objects in order to free up memory space. Detailed discussion of such a garbage collection technique may be found in U.S. patent application Ser. No. 11/031,015 entitled SYSTEM AND METHOD FOR CONCURRENT COMPACTING SELF PACING GARBAGE COLLECTION USING LOADED VALUE AND ACCESS BARRIERS, filed Jan. 7, 2005, which is incorporated herein by reference for all purposes. Every memory reference has a NMT bit indicating whether it has been traversed or marked through during a current garbage collection cycle. The NMTB protects against race conditions arising from concurrent marking. A marking parameter is maintained. It is stored in a control register in some embodiments. The parameter corresponds to an expected value for references that have been marked through during the current garbage collection cycle. The value of the marking parameter toggles between consecutive garbage collection cycles. The NMTB performs a test to determine whether the memory reference has been marked through by the garbage collector by comparing the Not Marked Through (NMT) bit of the memory reference with the expected value. If the NMT bit is set to the expected value, then the memory reference has been marked through by the garbage collector. Thus, the barrier is not triggered and the load instruction is performed normally. If, however, the memory reference has not been marked through, the barrier triggers, and a direct user mode trap is invoked. The direct user mode trap includes trap handler instruction(s) for ensuring that the memory reference is marked through or will eventually be marked through. In some embodiments, the trap handler simply marks the memory reference by setting the NMT bit to the expected value. In some embodiments, the memory reference is added to a work list of references to be marked through by the garbage collector later. In some embodiments, the direct user mode trap optionally includes instruction(s) that repairs the cause of the trap. For example, once the NMT bit of the memory reference is set to the expected value, the repaired memory reference is stored to the source address of the memory reference, such that when the same memory reference is loaded next time, the NMT bit will match the expected value and will not cause the barrier to trigger.

Figure 3:
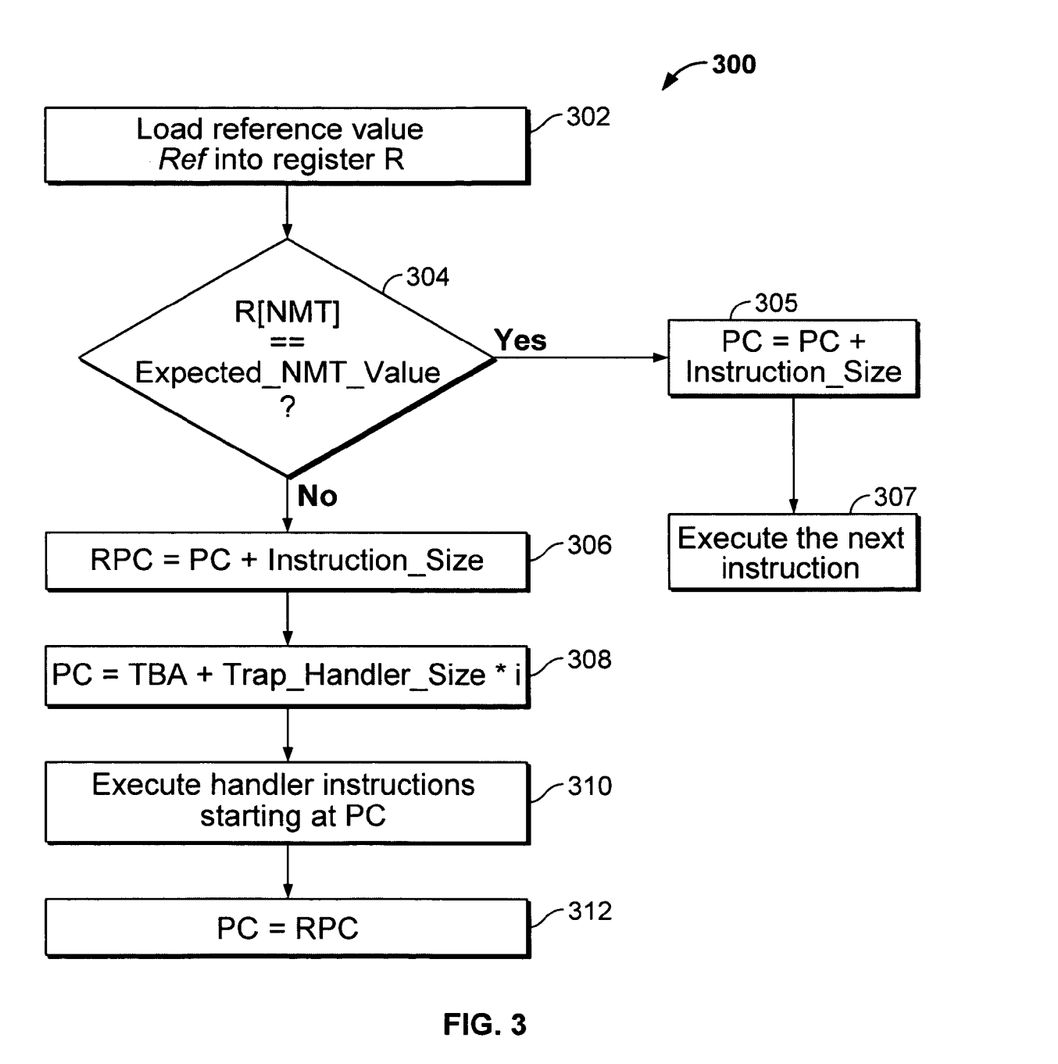
FIG. 3 is a flowchart illustrating an embodiment of a process for processing an NMT barrier.

FIG. 3 is a flowchart illustrating an embodiment of a process for processing an NMTB. In some embodiments, process 300 is included to implement 208-212 of process 200 on a system similar to 100 of FIG. 1. In this example, the instruction associated with the garbage collection barrier instruction is a NMTB instruction, and the condition being tested is whether a specific bit (i.e., the NMT bit) of an input memory reference meets an expected value (denoted as Expected_NMT_Value). Parameters such as Expected_NMT_Value, Instruction_Size (denoting the size of each program instruction), and Trap_Handler_Size (denoting the size of the trap handler, since a trap handler may include more than one instruction) are known before process 300 commences. In some embodiments, the values are stored in CSRs, which are accessible throughout the program's execution.

At 302, the memory reference under examination (Ref) is loaded into a general purpose register (R). At 304, the NMT bit of the memory reference, which is located at a known position, is compared with Expected_NMT_Value to determine whether the trap condition is triggered. If the NMT bit is the same as Expected_NMT_Value, the program counter increments by the size of the instruction at 305. The program counter (PC) register stores the address of the instruction to be executed next. At 307, the next instruction in the program's instruction sequence immediately follow the NMTB instruction is executed.

If, however, the NMT bit is not the same as Expected_NMT_Value, the trap condition is met and the processor will execute a trap handler in response to the condition. A return program counter (RPC) register is used to store the address of the instruction to which the processor should return after completing the trap handler instructions. At 306, the RPC is set to the value stored in PC plus the size of a single instruction in the program instruction sequence. In other words, information that is based at least in part on the current value of a program counter is saved.

In this example, the trap handlers are stored in an array with elements having a fixed size. In other embodiments, trap handlers can have different sizes. To access the appropriate trap handler that corresponds to the barrier condition, at 308, PC is set to a target address the base address of the trap handler array plus the size of a trap handler multiplied by the trap handler index i. The trap handler index may be located in a vector, a table, or other appropriate data structure that maps barrier conditions to trap handlers. The size of the array depends on the number of instructions per trap handler and may vary for different implementations. At 310, the instructions starting at the address stored in PC is executed. Here, the processor invokes the trap handler in a similar way as invoking a jump instruction to execute a subroutine. Unlike a jump instruction, which provides the address to which the processor is redirected in its argument, the garbage collection barrier instruction does not provide the target address in its argument. Instead, the target address is determined based on processor state information such as the trap handler base address, the trap handler size, the trap handler index, etc., as well as the outcome of the memory reference evaluation. The target address is otherwise independent of the arguments to the garbage collection barrier instruction. The trap handler can perform functions such as setting the NMT bit to the expected value, adding the reference to a work list of references to be marked through, and optionally repairing the source of the reference. In some embodiments, the trap handler includes a return instruction as its last instruction so the processor will return to the location from which it is redirected. At 312, PC is set to the address value stored in RPC so that the next instruction to be executed by the processor is the next instruction in the program instruction sequence.

In some embodiments, a process similar to process 300 is used to implement other barriers, where 304 is substituted with an appropriate test for the corresponding barrier that is implemented.

Figure 4:
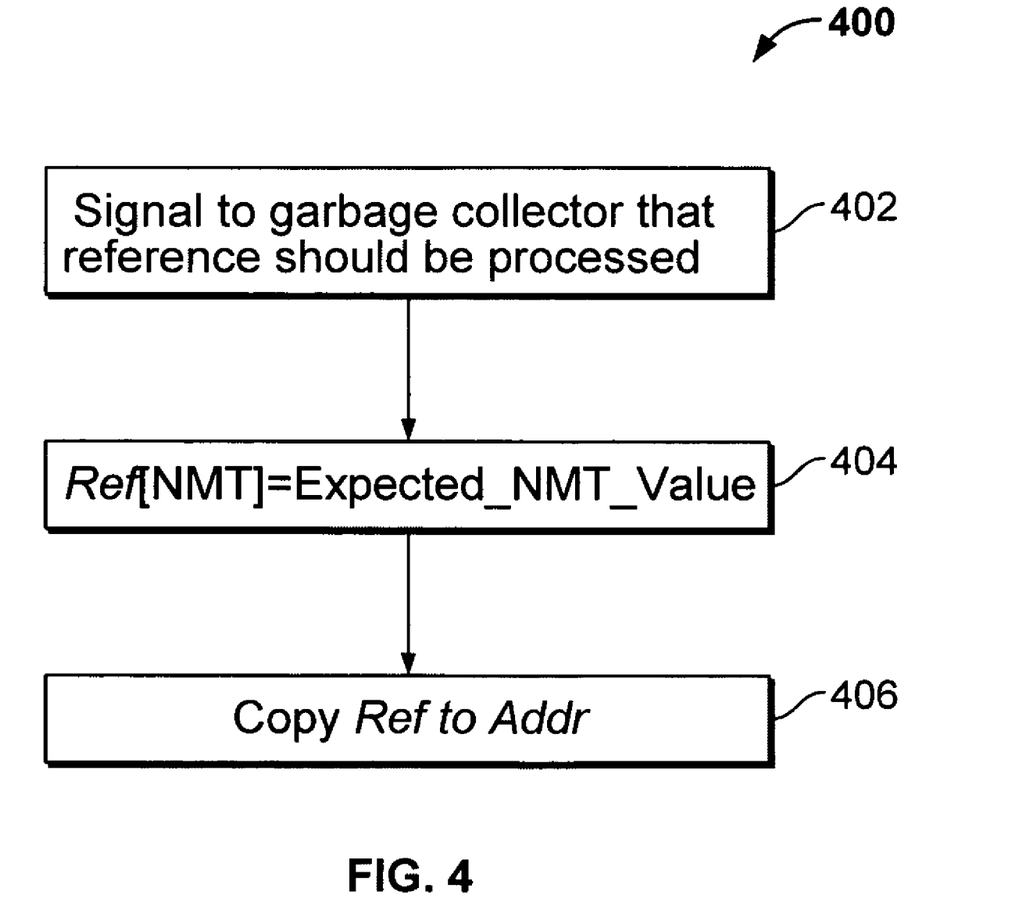
FIG. 4 is a flowchart illustrating an example process performed by an embodiment of an NMTB trap handler.

FIG. 4 is a flowchart illustrating an example process performed by an embodiment of an NMTB trap handler. Process 400 is included in 310 of FIG. 3 in some embodiments. Inputs to the trap handler include the memory reference (Ref) and the address from which the reference was loaded (Addr). Process 400 is carried out once the NMT test has determined that the NMT bit does not match the Expected_NMT_Value. In other words, Ref has not yet been processed by the garbage collector during this garbage collection cycle. At 402, the handler signals to the garbage collector that the reference should be processed by the garbage collector. The signaling can be accomplished in a number of ways, such as sending a message via an intra-process communication channel, adding the reference to a work list of the garbage collector, etc. At 404, the NMT bit Ref[NMT] is set to Expected_NMT_Value. At 406, the handler heals the source of the trap by copying the value of Ref to the memory at Addr. Thus, the NMT bit of the memory content starting at Addr will have the expected NMT value. As such, the cause for the trap is repaired and the next NMTB for a load instruction on the same reference will not be triggered.

In some embodiments, objects can be relocated by the garbage collector during the collection process. To ensure proper operation, an object that has been/should be relocated is protected so that it can be accessed by the garbage collector but not the mutators. An LVPB instruction is inserted between each load instruction that loads a reference from memory, and subsequent uses of the loaded reference by the program. The reference is an input to the LVPB. The LVPB performs a test to determine whether the reference corresponds to an object that has been relocated or should be relocated to a different memory region. In some embodiments, each object maintains a corresponding permission status, and the LVPB test is based on the permission status of the object that is referenced. In some embodiments, a permission status is maintained for each memory region, and the LVPB test is based of the permissions status of the page in which the object resides. The permission status indicates whether the object is accessible by the mutators, and whether the LVPB barrier instruction should trap. The permission status may be changed by the garbage collector during the garbage collection cycle. The permission status for different memory regions may be cached in a Translation Lookaside Buffer (TLB) in some embodiments. The permissions status for different regions may be read from corresponding memory locations. In some embodiments, the permissions status for each object may be stored within the object, or in a corresponding location.

In some embodiments, performing the LVPB test includes looking up in the TLB the permission status of the memory page which includes the object referenced by the memory reference. A process similar to 300 is used in some embodiments, where 304 is replaced with the inquiry of the memory page permission status in the TLB. If the referenced memory page has a permission level that allows it to be accessed by the garbage collector but not the mutators, then the barrier condition triggers. In other words, the test result shows that object has been relocated or should be relocated, and any reference/pointer to the object should be corrected and thus prevented from accessing the object. Thus, program counter based information is saved and target location is set. If the object has already been relocated, the trap handler code redirects the reference to the new location by, for example, following a forwarding pointer of the object. If the object has not yet been relocated, the trap handler can wait for the garbage collector to relocate the object then redirect the reference. Alternatively, the trap handler can relocate the object itself, generate a forwarding pointer, and redirect the reference. Optionally, the trap handler can also perform healing functions by following the source address of the reference and resetting the reference in the address to the object at the new location, such that future loads of the reference will not trigger barrier conditions.

SVB barriers are typically inserted prior to store instructions. SVB implemented in some embodiments performs one or more SVB related tests. Some examples include the marker test and the matrix test. The marker test determines whether a trap should be invoked based on whether a portion of data being addressed matches an expected marker value. It is similar to the NMT bit test discussed previously.

Figure 5:
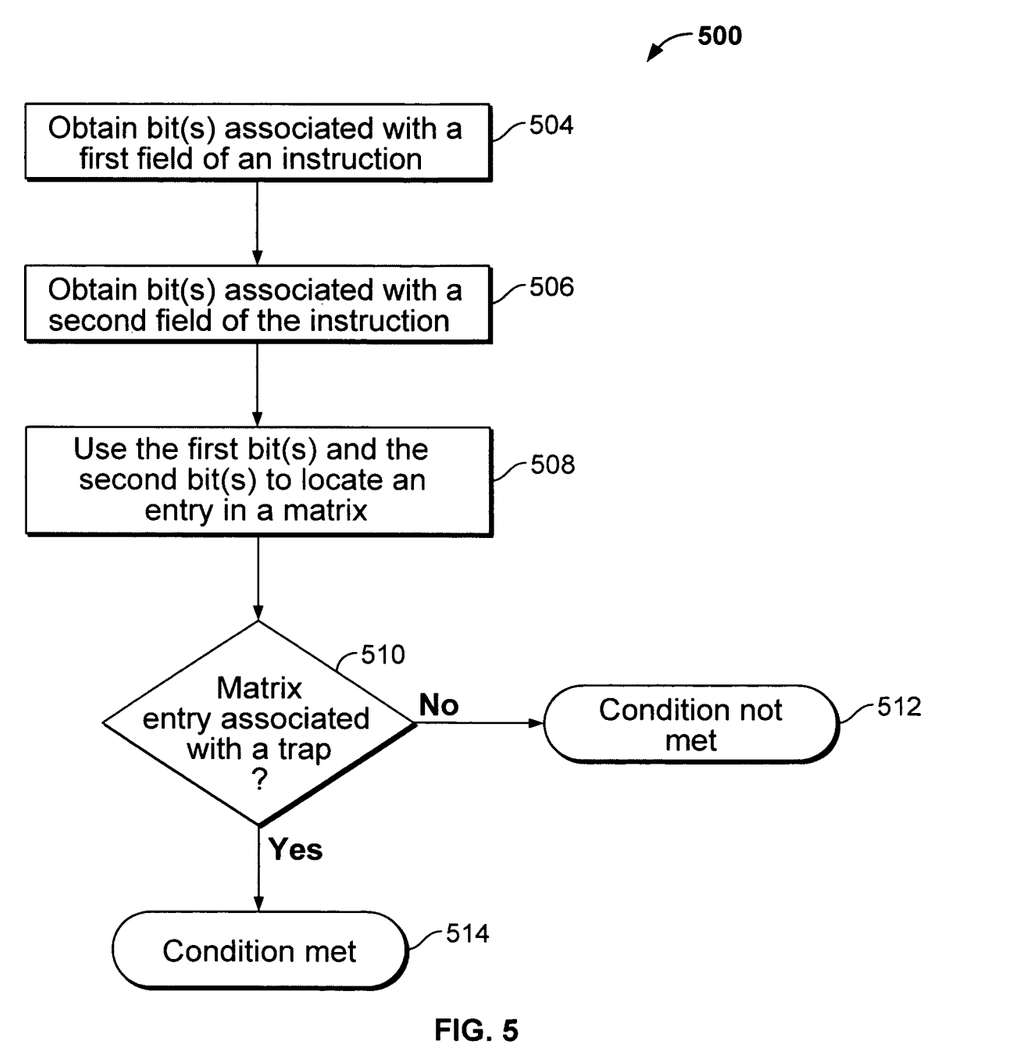
FIG. 5 is a flow chart illustrating an embodiment of a process that evaluates the condition by including a matrix test.

FIG. 5 is a flow chart illustrating an embodiment of a process that evaluates the condition by including a matrix test. In some embodiments, process 500 is included in the implementation of 208-210 of process 200. To perform the matrix test, at 504, one or more bits associated with a first field of the garbage collection barrier instruction are obtained. At 506, one or more bits associated with a second field of the instruction are obtained. In some embodiments, the first field is associated with an address, and the second field is associated with another address. In some embodiments, the bit(s) of the first and second fields are associated with a garbage collection generation. For example, the bit(s) are used to determine if an address associated with the field belongs to a group of objects designated as a new generation or a group of objects designated as an old generation. In some embodiments, the bit(s) of the first and second fields are associated with stack escape detection. For example, the bit(s) are used to determine if an address associated with the field belongs to a group of objects allocated on a stack or a group of objects allocated in a heap.

At 508, the obtained bit(s) of the first field and the obtained bit(s) of the second field are used to locate an entry in a matrix. In some embodiments, one of the obtained bit(s) are at least in part used to determine a matrix column value, and the other obtained bit(s) are at least in part used to determine a matrix row value. The entry in the matrix is the entry with the determined column value and the determined row value. In some embodiments, the matrix is associated with garbage collection. The matrix entry is associated with a trap determination. In some embodiments, the first field is associated with a value being stored to a location associated with the second field, and the matrix used to determine if the value being stored is escaping from one type of managed memory to another type of managed memory. Managed memory type, in some embodiments, includes garbage collection generation, and/or heap, and/or stack. For example, managed memory type may include new generation memory, and/or old generation memory, and/or stack allocated memory, and/or raw pointer memory. Managed memory types, in some embodiments, may overlap in address space. For example, a memory location may be referred to using multiple managed memory types. If the value being stored is escaping from one type of managed memory to another type of managed memory, then the barrier condition is triggered and a user mode trap is invoked. At 510, if the located matrix entry is not associated with a trap, at 512, it is determined that the condition has not been met. If at 510 the located matrix entry is associated with a trap, at 514, it is determined that the condition has been met. In some embodiments, the process 500 includes an optional null value check. If at least one field of the instruction includes a null value, the condition is not met. In some embodiments, the matrix is represented by a matrix bit field containing $2^{M+N}$ total bits, where M bits are obtained from the first field and N bits are obtained from the second field. The two fields of bits (M+N) are combined to determine the bit number in the matrix bit field that would indicate whether a trap is to be taken. For example, if M=2 and N=2, then the matrix can be represented by $2^4$=16 bits.

The STA instruction implementation is similar to the SVB barrier instruction, with a store operation included in the same instruction. The STA instruction takes a Ref and Addr argument, performs the SVB barrier tests on Ref and Addr, and if none of the barrier tests trigger, performs a store the Ref argument into Addr location.

Figure 6:
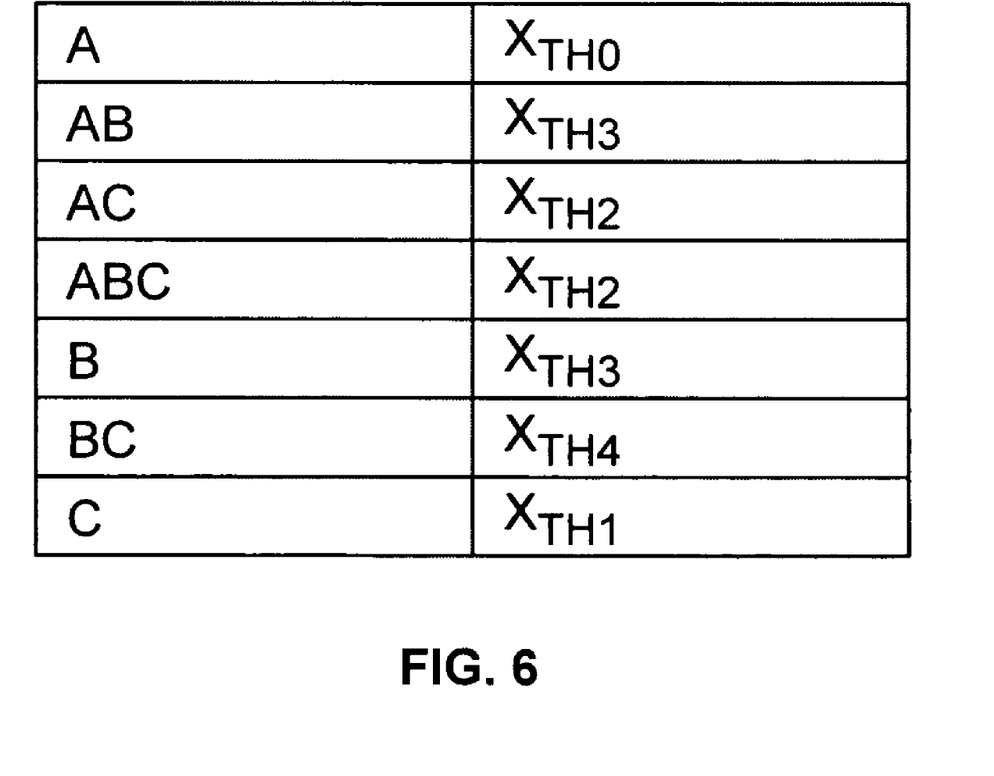
FIG. 6 is a diagram illustrating an embodiment of a mapping table maps test result combinations to trap handlers.

In some embodiments, a garbage collection barrier instruction performs a plurality of tests to determine whether the condition is met. In some embodiments, each test maps to a corresponding trap handler, and the trap handler of the first test that yields a positive result is executed. In some embodiments, each test maps to a corresponding trap handle and each trap handler has a corresponding priority level. If only a single test triggers, the trap handler corresponding to that test is invoked either as soon as the test triggers or when the tests finish. If more than one condition triggers, based on the priority levels of the conditions, a trap handler with the highest priority is selected and invoked. In some embodiments, which handler is triggered depends on the combination of test results. A mapping table of test result combinations and their respective handler is used in some embodiments. FIG. 6 is a diagram illustrating an embodiment of a mapping table that maps test result combinations to trap handlers. In this example, three tests, A, B, and C, are performed to evaluate the condition. The entries in the left column are combinations of test results that are positive. Each combination maps to an entry in the right hand column, which indicates the specific trap handler that should be invoked for this combination. In some embodiments, $X_{THi}$ stores the index of the i-th trap handler entry in a trap handler array. In other embodiments, $X_{THi}$ stores the address of the i-th trap handler. Other entry types can be used in other embodiments.

Executing programs in a garbage collected environment is disclosed. By using a garbage collection barrier instruction that triggers a direct user mode trap to handle barrier conditions, greater computational efficiency is achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system comprising:
 a processor; and
 a memory coupled to the processor, configured to provide the processor with a plurality of instructions including a plurality of garbage collection barrier instructions and a subsequent instruction that immediately follows the plurality of garbage collection barrier instructions; wherein the processor is configured to execute the plurality of garbage collection barrier instructions, including:
  evaluating a memory reference to determine a condition associated with the plurality of garbage collection barrier instructions; and
  in the event that the condition is met, while maintaining the same privilege level, saving information that is based at least in part on a current value of a program counter, and setting the program counter to correspond to a target location that is other than the subsequent instruction.

2. The computer system of claim 1, wherein the processor is further configured to execute one or more handler instructions starting at the target location.

3. The computer system of claim 2, wherein the processor maintains the same privilege level while executing the plurality of garbage collection barrier instructions and the handler.

4. The computer system of claim 2, wherein the target location is derived from the evaluation of the memory reference and processor state information, and is otherwise independent of argument to the plurality of garbage collection barrier instructions.

5. The computer system of claim 2, wherein the information saved is used by the processor to return to the subsequent instruction after the processor executes the one or more handler instructions.

6. The computer system of claim 2, wherein the processor is further configured to execute the subsequent instruction after executing the one or more handler instructions.

7. The computer system of claim 1, wherein the plurality of garbage collection barrier instructions includes a barrier for a store operation.

8. The computer system of claim 1, wherein the processor is configured to execute the plurality of garbage collection barrier instructions, including storing a value to a memory location.

9. The computer system of claim 1, wherein the plurality of garbage collection barrier instructions includes a barrier for a load operation.

10. The computer system of claim 1, wherein executing the plurality of garbage collection barrier instructions further includes loading a value from a memory location.

11. The computer system of claim 1, wherein evaluating the memory reference to determine the condition includes performing one or more tests.

12. The computer system of claim 11, wherein at least some of the tests have a corresponding priority.

13. The computer system of claim 12, wherein the target location depends on the priority of the at least some of the tests.

14. The computer system of claim 1, wherein evaluating the memory reference to determine the condition includes performing a plurality of tests, and the target location depends on a combination of the plurality of tests that triggered.

15. The computer system of claim 1, wherein the target location corresponds to a location in a handler array.

16. The computer system of claim 15, wherein a base address of the handler array is stored in a register.

17. The computer system of claim 1, wherein in the event that the condition is met, the processor is further configured to repair a cause for the condition.

18. The computer system of claim 1, wherein evaluating the condition includes determining whether a field in a garbage collection barrier instruction input matches an expected value.

19. The computer system of claim 18, wherein in the event that the field does not match the expected value, the processor is further configured to set the field to the expected value.

20. The computer system of claim 18, wherein the processor is further configured to place the memory reference garbage collection barrier instruction on a garbage collector work list.

21. The computer system of claim 1, wherein evaluating the condition includes determining whether the memory reference is associated with an object that has been relocated or should be relocated to a different memory region.

22. The computer system of claim 21, wherein evaluating the condition includes looking up a value in a Translation Lookaside Buffer (TLB).

23. The computer system of claim 21, wherein evaluating the condition includes looking up a value in memory.

24. The computer system of claim 1, wherein evaluating the condition includes performing a matrix test.

25. A method for executing a program in a garbage collected environment, comprising:
   providing a plurality of program instructions including a plurality of garbage collection barrier instructions and a subsequent instruction that immediately follows the plurality of garbage collection barrier instructions; and
   executing the garbage collection instruction, including by:
      evaluating a memory reference to determine a condition associated with the plurality of garbage collection barrier instructions; and
      in the event that the condition is met, saving information that is based at least in part on the current value of a program counter, and executing one or more sets of instructions of a target location that is other than the subsequent instruction.

26. A computer program product for memory management, the computer program product being embodied in a computer readable medium and comprising computer instructions including a plurality of garbage collection barrier instructions and a subsequent instruction that immediately follows the plurality of garbage collection barrier instructions for execution by a processor, wherein the processor is configured to execute the plurality of garbage collection barrier instructions, including by:
   evaluating a memory reference to determine a condition associated with the plurality of garbage collection barrier instructions; and
   in the event that the condition is met, while maintaining the same privilege level, saving information that is based at least in part on the current value of a program counter, and executing one or more sets of instructions of a target location that is other than the subsequent instruction.

* * * * *